UNITED STATES PATENT OFFICE.

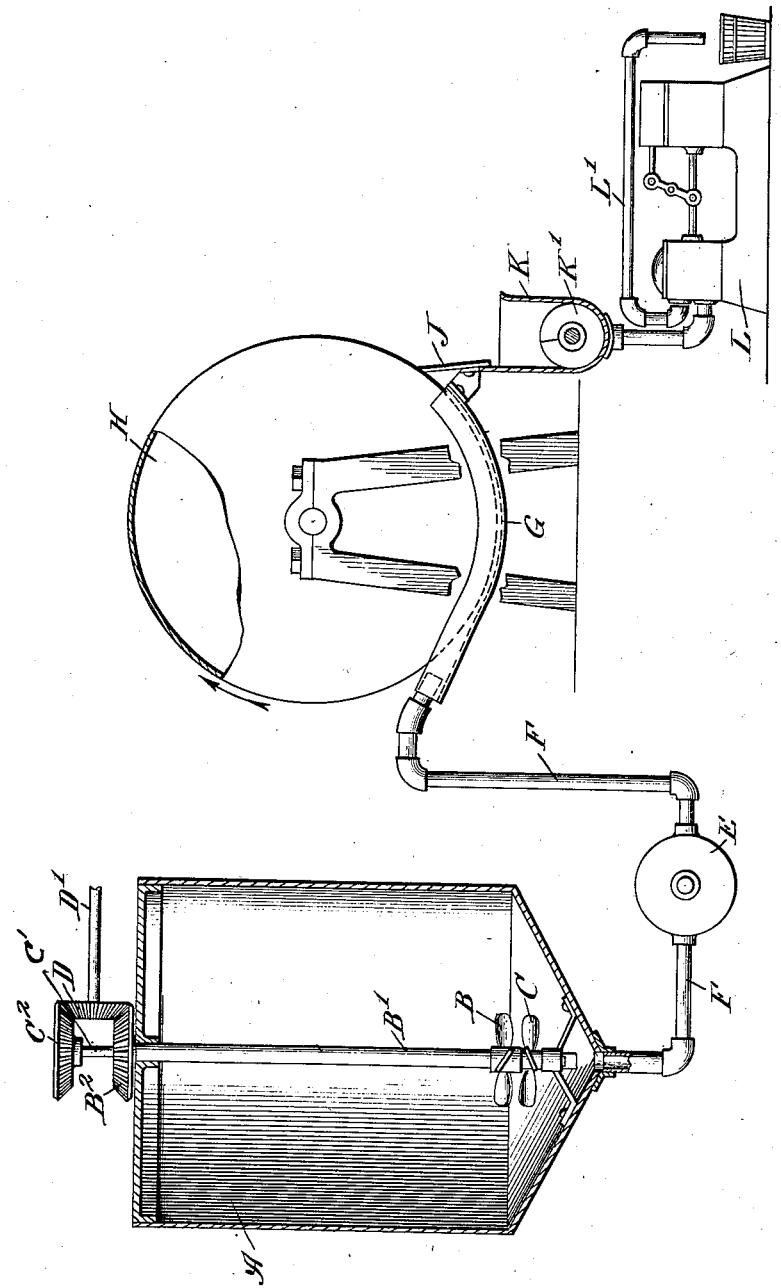

THEODORE E. SMITH, OF WEEHAWKEN, NEW JERSEY.

MANUFACTURE OF BUTTER SUBSTITUTES.

992,521. Specification of Letters Patent. Patented May 16, 1911.

Application filed May 3, 1907. Serial No. 371,682.

*To all whom it may concern:*

Be it known that I, THEODORE E. SMITH, a citizen of the United States, residing at Weehawken, in the county of Hudson and State of New Jersey, have invented certain new and useful Improvements in Methods for the Manufacture of Butter Substitutes, of which the following is a specification.

My invention relates to methods for the manufacture of butter substitutes, such as oleomargarine, butterine (sometimes called butterin) and the like, and has for its object to provide an improved process of manufacture by which a considerable saving of time and manipulation is effected over the processes now known and by means of which a more even product is obtained.

In the processes ordinarily followed at the present time, the ingredients, or some of them, are brought together in a vat and there heated and mixed, the liquid mixture is then run into a tank of cold water in order to solidify it, the fatty material being skimmed off the surface of the water, and then carried to cooling rooms. After having cooled for some time, ordinarily twelve hours, the material is then kneaded or worked to remove the excessive water and to obtain a uniformity of texture, and is then packed into tubs or compacted in other forms suitable for the market. The salting of the product may be effected by adding brine or salt to the original mixture, or by kneading it into the half finished product during the working step. Such methods as these are attended by several disadvantages; for example, the process consumes in all a very considerable time and requires a plant of considerable extent and the maintenance of cooling rooms where the temperature must always be kept very low. When the liquefied composition is run into the water tank, it takes up a certain amount of water, the amount varying according to the temperature of the water. This necessitates the working step, in which some of the water is forced from the product, but, as the amount of water taken up is variable, and the working cannot be carried on under uniform conditions, the resulting product is necessarily uneven in respect to the amount of water which it eventually contains. The working itself is a disadvantage, as it reduces the temperature at which the finished product will slump or melt. If the salt is added to the original composition, it hinders the emulsification of the combined elements, or renders the emulsion so unstable that it does not last until the mixture is sufficiently solidified to hold the elements in proper combination. If the salt is added in the working step, the amount is difficult to be measured with accuracy and the product has to be kneaded to a greater extent to properly distribute the salt.

By my process, butter substitutes may be made in a much shorter time by a single, continuous process, and in a plant of considerable less size, than is required under the old methods. The various ingredients may also be accurately measured and a perfect equality of product insured.

The apparatus for carrying out my process is diagrammatically illustrated in the accompanying drawing.

A represents a mixing tank, such as is shown in my Patent No. 829,356, dated August 21, 1906. Another form of mixer might be used, but the form shown is suitable for carrying out my process and is here shown for purposes of illustration.

Within and at the bottom of the tank are a pair of propellers, B, C, having blades with opposite inclinations and designed to be rotated in opposite directions through the agency of the shafts B' and C', carrying the gears $B^2$ and $C^2$, which may be simultaneously driven by the gear D on the shaft D'.

The ingredients for making the butter substitute will be brought together in the tank A, either in heated condition or the tank will be arranged so as to be subjected to heat. Preferably, the ingredients, whatever they may be, butter, cream, milk, skimmed milk, lard, oleo oil, beef tallow, oleo stearin, cottonseed oil, salt, casein, coloring matter, water, are brought together in the definite proportions in which it is desired that they should be in the finished product. The salt, when used in considerable quantities, which is sometimes necessary, is preferably first thoroughly coated with oil before it is put into the mixture by stirring it with oil in a separate vessel. This prevents the salt from affecting the emulsion.

By rotation of the propellers, the heavier ingredients of the mixture are driven up in a relatively narrow column through the lighter ingredients, as clearly described in my patent above referred to, the result being a very intimate emulsive mixture of the solid mass before the elements thereof can separate or be precipitated to any material extent.

7. The process of forming butter-like compounds, which comprises mechanically intermingling with each other all of the ingredients capable of being liquefied while in a fluid condition, coating with oil the particles of a sufficient quantity of salt for seasoning the compound, mixing the salt, so coated, with other ingredients, whereby an emulsion is formed having the salt distributed therethrough, and then solidifying the emulsion by exposing it to a reduced temperature before the emulsion has begun to separate.

8. The process of seasoning butter and butter-like compounds, which comprises first applying an oily coating to the particles of salt, and then intermingling the coated salt with the other ingredients.

9. The process of distributing solid particles evenly throughout emulsive compounds, which comprises applying an oily coating to said particles, and then mechanically intermingling the same with the other elements to form an emulsion.

10. The process of forming butter-like compounds, which comprises applying an oily coating to particles of salt, and then mechanically intermingling the salt with all of the other ingredients while such other ingredients are in a fluid or semi-fluid condition, to form an emulsion having the salt distributed therethrough, and then solidifying the emulsion by exposing it to a reduced temperature.

THEODORE E. SMITH.

Witnesses:
  CHAS. O. LOWE,
  JOSEPH A. KREUZER.